June 4, 1968  S. A. GRAY  3,386,343
DYNAMICALLY CONSTANTLY VARIABLE GAIN SERVOCONTROL SYSTEM
Filed Aug. 20, 1965
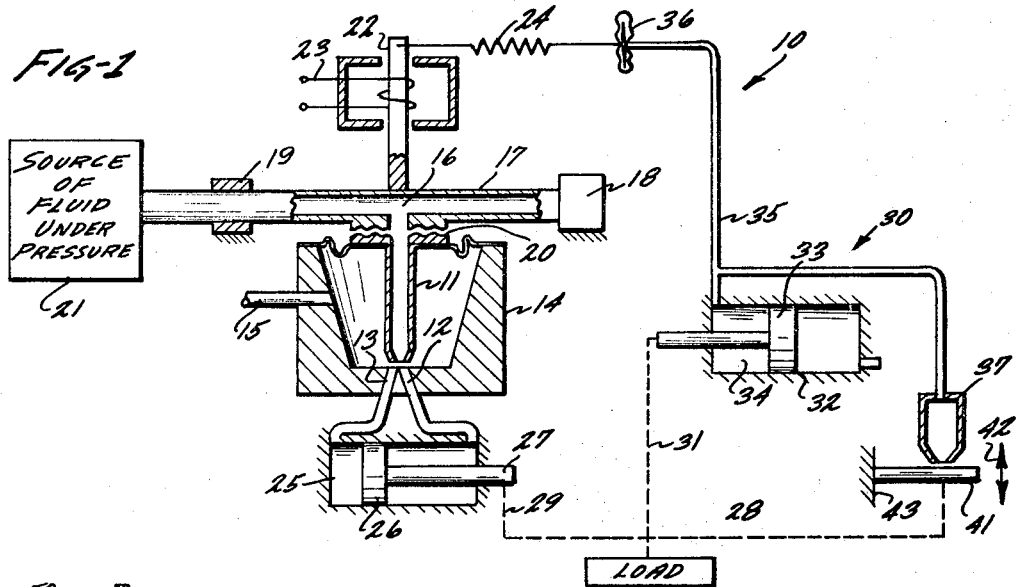
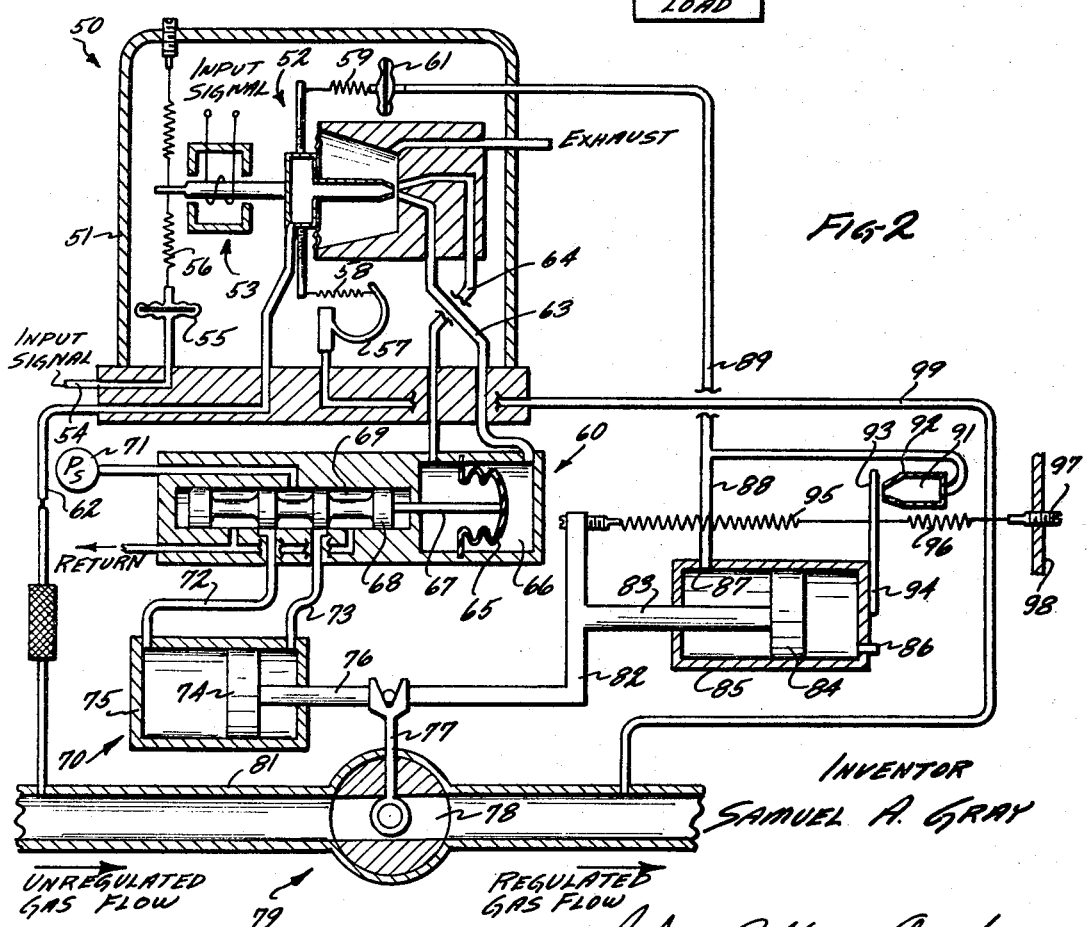
INVENTOR
SAMUEL A. GRAY
BY
ATTORNEYS

United States Patent Office 3,386,343
Patented June 4, 1968

3,386,343
DYNAMICALLY CONSTANTLY VARIABLE GAIN
SERVOCONTROL SYSTEM
Samuel A. Gray, Sun Valley, Calif., assignor to Bell
Aerospace Corporation, a corporation of Delaware
Filed Aug. 20, 1965, Ser. No. 481,336
12 Claims. (Cl. 91—364)

ABSTRACT OF THE DISCLOSURE

Disclosed is a jet pipe device supported upon a torsion tube having a source of fluid under pressure directed through the tube into the jet pipe. Movement of the jet pipe is accomplished by the application of signals thereto from a number of sources; for example, an electrical command signal a pressure feedback signal, an input signal indicating system pressure, a signal representing regulated flow pressure, or the like, to accomplish control of a desired apparatus—for example, such as a flow control valve in a gas pipeline. The feedback signal may be generated by a rate of change responsive feedback network which includes a piston positioned within a cylinder to define a chamber the volume of which changes responsive to movement of the actuator connected to the valve. As the volume of the chamber varies, the pressure therein changes dependent upon the rate of movement of the piston and the escape from the chamber of the pressure is controlled by the positioning of the flapper adjacent a nozzle defining a restricted orifice. The nozzle-orifice combination is connected through a diaphragm to the jet pipe to affect position thereof.

This invention relates generally to hydraeric servocontrol systems and more particularly to such a system employing a multiple input servovalve to which various input signals may be applied and including as one part thereof, a feed back network for applying a signal thereto indicative of the rate of movement of a controlled member to the servovalve within the system. The term "hydraeric" as used throughout this specification and the appended claims is defined as being generic to hydraulic and pneumatic and as synonymous, in the broad sense, with fluid under pressure.

It has been long desirable in the control system arts involving hydraerics to receive a multiplicity of command and/or feed back signals for controlling a given object, process, or other load. In the prior art utilization of such multiple signals has been accomplished by employing a plurality of control devices each receiving a given number of the signals. When using a plurality of such devices, the overall control apparatus becomes large and bulky and as a result is more expensive to manufacture and maintain. The reliability of such a system is not as good as desired because of the large number of parts involved in various control devices. It has also been found that by using several control devices a phase lag is added by each such device and the overall performance is degraded thereby.

Accordingly, it is an object of the present invention to provide a servocontrol apparatus using a single control element which is capable of receiving a multiplicity of input signals all of which are summed at a single point, thereby providing a system which is simple, inexpensive, easier to maintain, has improved performance, and is more reliable than systems heretofore known in the prior art.

There are many applications in which a servovalve control system is utilized, wherein it is desired to obtain extreme accuracy while at the same time maintaining very firm stability of the system and of the controlled member or load apparatus which is moved thereby. One such application wherein such accuracy and stability would be required is where a very minute change in the controlled member may cause a rather large or drastic change in the overall object which is being controlled, such as, for example, in a fluid pressure regulation system having a small flow volume. Under these circumstances, the positioning of the controlled member must be extremely accurately and quickly accomplished and the system must be sensitive to all possible factors which could affect the system regulated pressure.

It is at the same time desirable under certain given applications that the servovalve control system operate in such a manner that rather large changes in position of the controlled element are required to effect any noticable changes in the overall subject matter which is being controlled by the system, such as, for example, in a fluid pressure regulation system having large flow volume. When the overall subject matter being controlled has each of the two above requirements present therein, such as a regulated fluid pressure under varying flow volume, it is desirable that the servovalve control system be operable under all such conditions. No known prior art systems are so operable over a large range of the variable conditions without the inclusion of a multiplicity of servo valves, each operable in response to the particularly desired condition or flow volume range with which it is interconnected.

Accordingly, it is further an object of the present invention to provide a servovalve control system which is capable of obtaining precise accuracy in positioning of a controlled member without at the same time destroying system stability.

It is another object of the present invention to provide a servovalve control system which is adapted for receiving a multiplicity of input signals for effecting control of a desired member.

It is still another object of the present invention to provide a servovalve control system which is responsive to a rate of change of the controlled member.

It is still a further object of the present invention to provide a servovalve control system which has a variable gain dependent upon the rate of change of the controlled member and the position thereof for any given application.

Additional objects and advantages of the present invention both as to its organization and method of operation will become apparent from a consideration of the following description taken in conjunction with the accompanying drawing which is presented by way of example only and is not intended as a limitation upon the scope of the present invention as defined in the appended claims and in which:

FIG. 1 is a schematic representation of a servovalve control system utilizing a feed back network in accordance with the present invention; and FIG. 2 is a schematic representation of a control system in accordance with the present invention applied to effect a desired result.

A feed back network which is responsive to the rate of change in position of a controlled member in accordance with the present invention is usable in a hydraeric power servocontrol system which includes a servovalve therein having a control means which is responsive to applied control signals for controlling application of hydraeric fluid to an actuator. The feed back network includes a pressure signal generating apparatus which is movable in response to movement of the actuator and as a result of the movement thereof generates a pressure signal which is proportional to the rate of movement of the actuator. Means is interconnected between the signal generating apparatus and the servovalve so as to couple the thus generated signals to the servovalve thereby to effect a response of the control means to the signals thus generated to in turn effect changes in movement of the actuator in accordance therewith.

Referring now to the drawing and more particularly to FIG. 1 a system employing rate feed back in accordance with the present invention is schematically generally illustrated. As is therein shown, a servovalve 10 includes a jet pipe 11 which is positioned over receiver ports 12 and 13 formed by a portion of a housing 14 also defining an exhaust or return port 15. The jet pipe 11 is pivotable about a pivot point 16 upon the torsion tube 17. The torsion tube 17 as is illustrated, is hollow and is fixed at its right end to an anchor member 18 and the left end to an anchor member 19. The anchor members 18 and 19 may, for example, be a part of the housing for the servovalve. The hollow torsion tube 17 extends through the anchor member 19 and is connected to a source of fluid under pressure 21. The fluid thus flows through the hollow torsion tube 17 and downwardly through the jet pipe 11 to the receiver ports 12 and 13. The upper portion of the jet pipe assembly 11 forms the armature 22 for a torque motor as is well known, to which electrical input signals can be applied as shown by the input leads and terminals 23. A mechanical input can also be applied to the upper portion of the jet pipe assembly as is indicated by the spring means 24. The lower portion of the apparatus as illustrated in FIG. 1 has been rotated 90° for purposes of ease of illustration and clarity of description. This rotation is indicated by the broken line 20.

As the jet pipe 11 moves about its pivot point 16 in response to the application of input signals thereto, a differential in pressure appears in the receiver ports 12 and 13, depending upon the position of the jet pipe, which is applied to opposite sides of the actuator cylinder 25, thus causing the piston 26 to move in accordance therewith. Movement of the piston 26 in the actuator in turn moves the actuator rod 27. As the actuator rod 27 moves, the load 28 responds thereto and assumes the desired position or condition dependent upon the particular application to which the servovalve is being put. Such interconnection between the load 28 and the actuator rod 27 is shown by the dashed line 29.

A signal generating means 30 is movable in response to movement of the actuator rod 27 as is shown by the dashed line 31. The signal generating means as illustrated in FIG. 1 includes a chamber defining means such as the cylinder 32. The cylinder 32 has a piston 33 movably disposed therein. The combination of the cylinder 32 and the piston 33 defines a chamber area 34, the volume of which is changeable as the piston 33 is caused to move responsive to movement of the actuator rod 27. It should be expressly understood that the piston 33 may be connected to the load 28 or to the actuator rod 27. In either event, the piston 33 moves only in response to movement of the actuator rod 27. As the volume of the chamber area 34 changes responsive to movement of the actuator rod 27, a pressure signal is generated within the chamber 34. The pressure signal thus generated is coupled by way of conduit 35 and a diaphragm valve 36 to the spring 24 which in turn is connected to the upper position of the armature 22. Thus, the pressure signal generated as a result of movement of the piston 33 is connected as an input signal to the servovalve 10. The signal thus causes movement of the jet pipe 11 in a manner to effect a desired position change in the load 28. The chamber 34 is ported by means of a restricted orifice defining member such as a nozzle 37. By having the chamber 34 thus ported through the nozzle 37 orifice, the only signals which transmitted by conduit 35 to the servo valve 10 are those generated as a result of and only during movement of the actuator rod 27. During the period of steady state conditions, that is, when the actuator is non-moving and the piston 33 is non-moving, all pressure changes that may have previously been generated are relieved through the orifice of the nozzle 37.

It has been found under many conditions that the sensitivity of the servovalve feed back network should be controlled by the effect which a movement of the actuator rod 27 would have upon the load. Such a result is accomplished in accordance with the present invention by providing means such as a flapper 41 which is movable responsive to movement of the actuator rod 27 in such a manner as indicated by the arrow 42 to effectively vary the area of the orifice of the nozzle 37. The flapper 41 is anchored at one end as indicated by the ground symbol 43.

In operation of the structure as illustrated in FIG. 1, assuming that the actuator rod 27 moves in such a manner as to cause the flapper 41 to move closer to the orifice of the nozzle 37, thus reducing the effective area of the orifice, it can be seen that signals generated in the chamber 34 have a greater magnitude for a given movement of the piston 33 and require a longer period of time to be relieved through the more restricted orifice of the nozzle 37. Since the signals have a greater magnitude, a stronger signal is thus coupled through the conduit 35 to the servovalve 10. If the phasing of the signal thus generated is such as to effect a negative feed back, then a position change of the load is accurately controlled but the stability of the servovalve is maintained.

Assuming that the movement of the actuator rod is such that the flapper 41 moves away from the nozzle 37 orifice, it can be seen that the effective area of the nozzle orifice is thus increased. Under these circumstances, movement of the piston 33 to generate a signal by way of a pressure change in the chamber 34 would have a greatly reduced effect on the servovalve 10 since a greater portion of the pressure change effected by movement of the piston 33 is more quickly relieved by being ported through the nozzle 37 enlarged orifice area to exhaust or return as the case may be.

It can thus be seen that as the actuator rod 27 moves the load, the piston 33 generates a pressure change signal within the variable volume chamber 34 which is proportional to the movement that has thus been imparted to the load. Simultaneously, the flapper 41 is also moved closer to or further away from the nozzle orifice 37, depending upon the desired sensitivity of the servovalve 10. Such change occurs constantly so long as the actuator is in fact moving in response to input signals applied to the servovalve. It can therefore be seen that the effective area of the orifice of the nozzle 37 is being dynamically constantly varied and as it varies, the effect of the feed back signal on the servovalve is also varying. That is, the overall loop gain of the system is varied dynamically constantly as the actuator is moved.

A further and better understanding of the multiple input control apparatus employing the rate feed back network and the dynamically constantly variable gain of the system can be obtained by reference to FIG. 2 in which such an apparatus is illustrated as applied to provide a regulated gas pressure under varying flow conditions. As is therein shown, a servovalve 50 controls the flow of fluid to a spool valve 60 which then in turn applies the fluid to an actuator 70. Positioned within the housing 51 for the servovalve 50, is a control member such as a jet pipe assembly 52 which is substantially similar to that above described and therefore will not be described in detail with respect to FIG. 2. Input signals are applied to the jet pipe assembly electrically by way of the torque motor 53. Input signals are also applied pneumatically and mechanically, such as for example, a pneumatic input signal can be applied to the conduit 54 and be coupled through the diaphragm valve 55 and spring 56 to the jet pipe assembly. A signal may also be applied by way of the Bourdon tube 57 and spring 58 which is connected to one end of the torsion bar which supports the jet pipe assembly. The opposite end of the torsion bar may be interconnected by a spring 59 to a second diaphragm valve 61 which is connected to a source of pressure as will be more fully described hereinafter. All of these various input signals to the jet pipe assembly are summed at a common point, namely at the pivot P, to effect the desired movement of the jet pipe over the receiver ports as above described.

It should now be expressly understood that the servo valve of the present invention integrates all of the input signals into a unified member and reduces them effectively to a single signal, manifest in jet pipe movement, effective to control the load. These multiplicity of signals may be from various sources such as, for example, a pressure control signal applied to conduit 54, a process feed back signal applied to conduit 99, a rate feed back signal applied to conduit 89 and an electrical control signal applied to torque motor 53 all being summed at pivot point P.

Upon movement of the jet pipe over the receiver ports, the hydraeric fluid such as gas, which is applied thereto through the conduit 62, passes through the conduits 63 and 64 and applies a differential pressure across the bellows 65 positioned within the chamber 66. The bellows 65 moves to the right or to the left in response to the differential pressure applied thereacross. As the bellows 65 thus moves, it moves a rod 67 therewith. The rod 67 is connected to a spool valve 68 positioned within a bore 69 as is well known. Movement of the spool valve 68 controls the application of hydraeric fluid under pressure from a source 71 also designated $P_s$ through the conduits 72 and 73 to the actuator 70. Operation of a spool valve to accomplish this result is well known in the prior art and will not be further described herein.

In response to the application of the differential pressure to the actuator, the piston 74 disposed within the cylinder 75 moves to the left or right as the case may be. As the piston 74 moves, the actuator rod 76 connected thereto also moves. The actuator rod in turn, is connected to a crank arm 77 which moves a valve closure member 78 of the valve 79 which is connected in a conduit means 81, which transports a flow of fluid to a desired consumption point, such, for example, as natural gas. Thus, the actuator rod 76 is moved to the left or right, as the case may be, the valve closure member 78 is rotated within the valve body 79 to open or close the valve thus permitting the gas to flow from the source to the consumption point in accordance with the desired regulation criteria.

The actuator rod 76 is in turn connected by an extension thereof, 82, to an additional rod 83 connected to a piston 84 which is housed within a cylinder 85 having a port 86 to the atmosphere in one end thereof. The cylinder 85 also defines an additional port 87 to which is connected a conduit 88. The conduit 88 is in turn connected to a conduit 89 which connects to the diaphragm valve 61 above pointed out. The conduit 88 terminates in a nozzle 91 having an orifice 92 therein. The orifice 92 has one end of a flapper 93 positioned adjacent thereto. The flapper 93 has its opposite end affixed to the cylinder 85 as is shown at 94 merely for purposes of anchoring the same.

The flapper 93 is connected by a means of spring 95 to the extension member 82. The flapper 93 is also connected by way of spring means 96 to an adjusting or set screw 97 which is properly anchored as indicated by the ground symbol 98.

As is noted in the gas flow system illustrated in FIG. 2, the source of gas flow is positioned to the left and therefore is unregulated at that point. After passing through the valve 79 which is controlled by the servo system connected thereto, the flow of gas to the right or downstream of the valve is a gas flow which is regulated in accordance with the desired criteria, such, for example, as maintaining a constant pressure for the consumers of the gas irrespective of the flow demands thereof. The pressure of the regulated gas flow is sensed by the conduit 99 which is in turn connected to the Bourdon tube 57 which forms an input to the jet pipe assembly 52.

As can be seen, any change in position of the valve closure means 78 produces a change in position of the piston 84. Depending upon the position of the flapper 93, the piston 84 movement produces a pressure signal of greater or lesser magnitude and corresponding effect as to the position of the jet pipe. For example, assuming the flow requirement is small for the system as illustrated, the valve closure member would be almost closed as shown in FIG. 2 to maintain the desired pressure and flow conditions. Under these conditions, a very minute change in position of the valve closure member 78 causes a large change in gas flow. Therefore, arm extension 82 has moved toward the right and the flapper 93 is almost closing orifice 92 and a large magnitude feed back signal is developed for a relatively small movement of piston 84. If full flow is demanded, then valve closure member 78 is rotated counterclockwise and is full open. Under these conditions a small change in position of member 78 would have little or no affect on flow or pressure. Therefore, the arm extension 82 is at the far left and the flapper is toward the left opening the orifice 92 to its full area. Thus, feed back signals generated only in response to actuator movement and having a magnitude depending upon the rate of such movement and being variable depending upon the desired sensitivity are applied to the jet pipe assembly as an input signal.

As is also seen, the regulated pressure of the gas flow is applied as an input signal. Thus, for example, if a pneumatic or electrical signal is applied commanding a predetermined pressure, the difference between the command signal and the regulated pressure is summed at point P and effects movement of the jet pipe accordingly.

A system of the type illustrated in FIG. 2 has been installed to control and regulate the flow and pressure respectively in a natural gas system. One valve controlled by the multi-input servo valve of the present invention, maintained a constant pressure over flow ratios of 1500 to 1. The best known prior art system is capable of maintaining a constant pressure over flow ratios of only 15 to 1.

There has thus been disclosed a specific embodiment of a multi-input servovalve having rate feed back and variable gain. Although certain details of the system have been specifically shown and described, such is not to be taken as a limitation upon the scope of the present invention as defined in the appended claims.

What is claimed is:

1. A hydraeric servocontrol system including a multi-input hydraeric servocontrol valve for applying hydraeric fluid to an actuator comprising:
   a housing member;
   a control member having a pivot point;
   suspension means connecting said control member to said housing to permit said control member to pivot about said pivot point;
   first input signal means connected to apply an electrical signal to said control member;
   second input signal means connected to apply a pneumatic signal to said control member including:
      a torsion far effectively affixed to the pivot point of said control member,
      a pressure responsive member for connection to a source of hydraeric pressure, and
      means connecting said pressure responsive member to said torsion bar; and
   a rate feed back network comprising:
      pressure signal generating means movable responsive to movement of said actuator to generate a pressure signal proportional to the rate of movement of said actuator;
      means interconnecting said pressure signal generating means and said servovalve to couple said pressure signal to said servovalve to effect response of said control member thereto.

2. A hydraeric servocontrol system as defined in claim 1 in which said pressure signal generating means is a cylinder having a piston movable therein and connected to said actuator, said cylinder defining a port therein connected to a restricted orifice.

3. A hydraeric servocontrol system as defined in claim 2 in which said restricted orifice has a variable area, said area variation being responsive to the position of said actuator.

4. A multi-input hydraeric servocontrol valve comprising:
- a housing member;
- a control member having a pivot point;
- suspension means connecting said control member to said housing to permit said control member to pivot about said pivot point;
- first input signal means connected to apply an electrical signal to said control member; and a torsion bar effectively affixed to the pivot point of said control member and having first and seconds ends extending on opposite sides of said control member;
- first and second pressure responsive members for connection to first and second sources respectively of hydraeric pressure signals; and
- first and second means respectively connecting said first and second pressure responsive members to said first and second ends of said torsion bar.

5. A multi-input hydraeric servocontrol valve as defined in claim 4 in which said first pressure responsive member is a diaphragm and said second pressure responsive member is a Bourdon tube.

6. A multi-input hydraeric servocontrol valve as defined in claim 5 which further includes an extension member on said control member and second signal input means connected to said extension member.

7. A multi-input hydraeric servocontrol valve as defined in claim 6 in which said second signal input means is a third pressure responsive member and means connecting said third member to said extension member.

8. A multi-input hydraeric servocontrol valve as defined in claim 6 wherein said first signal means is a torque motor and said connecting means are all springs.

9. In a hydraerically powered servocontrol system having a servovalve including control means responsive to a control signal for controlling application of hydraeric fluid to an actuator for connection to a load means, a feed back network responsive to rate of change in the position of said load comprising:
- pressure signal generating means including a cylinder having a piston therein and defining a chamber, said piston being movable responsive to movement of said actuator to vary the volume in said chamber thereby to generate a pressure signal proportional to the rate of movement of said actuator;
- means interconnecting said pressure signal generating means and said servovalve to couple said pressure signal to said servovalve to effect response of said control means thereto;
- means defining a restricted orifice connected to said pressure signal generating means for relieving the pressure signal therein during steady state conditions; and
- means movable responsive to movement of said actuator for changing the effective area of said orifice.

10. In a hydraerically powered servocontrol system having a servovalve including control means responsive to a control signal for controlling application of hydraeric fluid to an actuator for connection to a load means, a feed back network responsive to rate of change in the position of said load comprising:
- chamber defining means having a movable portion for changing the volume of said chamber;
- means connected to said movable portion of said chamber defining means movable responsive to movement of said actuator to change the volume of said chamber,
  - the change in volume of said chamber generating a change in pressure within said chamber;
- means defining a restricted orifice connected to said chamber defining means to relieve the pressure within said chamber during steady state conditions;
- means movable responsive to movement of said actuator for changing the effective area of said orifice; and
- means interconnecting said servovalve and said chamber defining means to couple said pressure changes to said servovalve to effect response of said control means thereto.

11. A feed back network as defined in claim 10 in which said means defining a restricted orifice is a nozzle and in which said means movable responsive to movement of said actuator to vary the effective area of said orifice is a flapper positioned adjacent said nozzle orifice.

12. A feed back network as defined in claim 11 in which said piston means, said actuator and said flapper are mechanically interconnected to move simultaneously.

References Cited

UNITED STATES PATENTS

| | | | |
|---|---|---|---|
| 2,172,315 | 9/1939 | Blasig | 91—364 |
| 2,681,044 | 6/1954 | Eggenberger | 91—364 |
| 2,789,543 | 4/1957 | Popowsky | 91—387 |
| 2,989,950 | 6/1961 | Lockman | 91—388 |
| 2,995,116 | 8/1961 | Dobbins | 91—387 |
| 2,996,072 | 8/1961 | Atchley | 137—83 |
| 3,017,864 | 1/1962 | Atchley | 91—3 |
| 3,101,031 | 8/1963 | Crossley | 91—364 |
| 3,137,309 | 6/1964 | Blase et al. | 137—83 |
| 3,282,283 | 11/1966 | Takeda | 91—3 |

MARTIN P. SCHWADRON, *Primary Examiner.*

PAUL E. MASLOUSKY, *Assistant Examiner.*